May 26, 1931. V. EHMIG 1,807,203
CONSTRUCTION OF AEROPLANES
Filed Sept. 17, 1930 7 Sheets-Sheet 1

INVENTOR
VICTOR EHMIG
BY
ATTORNEYS

May 26, 1931. V. EHMIG 1,807,203
CONSTRUCTION OF AEROPLANES
Filed Sept. 17, 1930 7 Sheets-Sheet 2
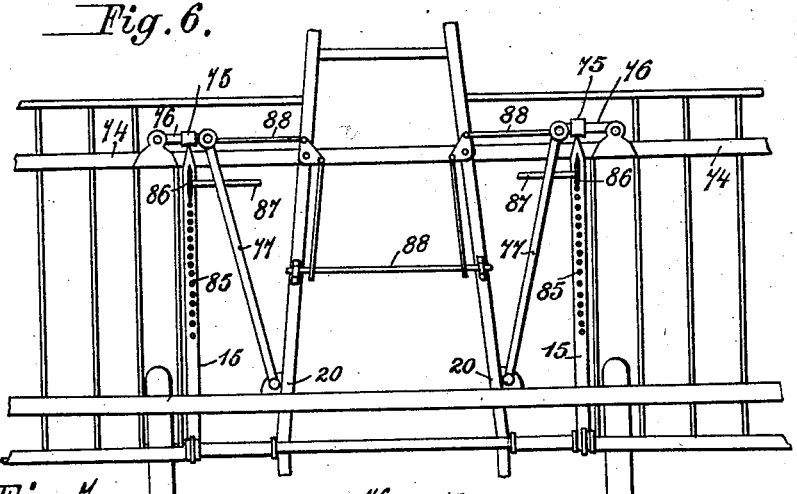
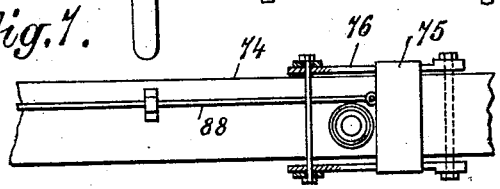
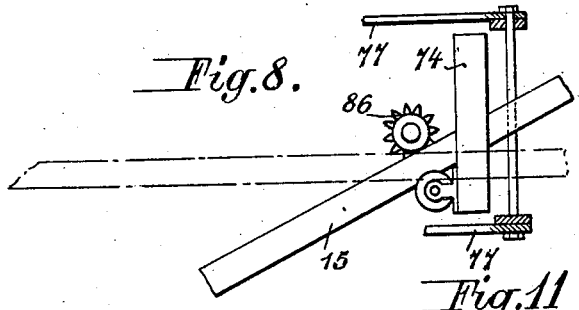
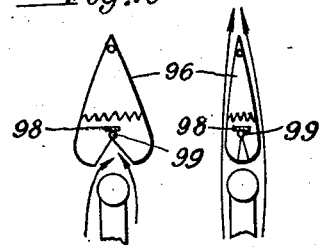
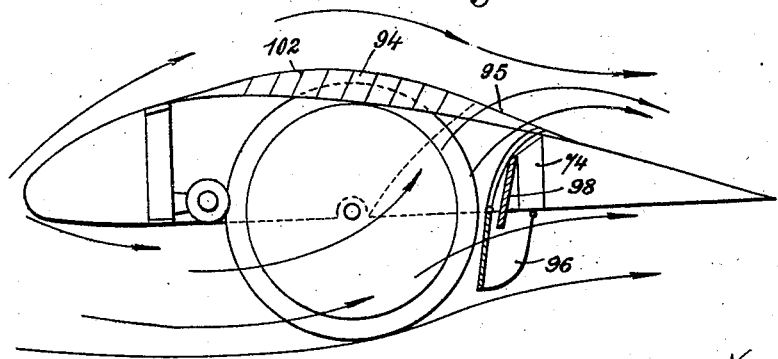
INVENTOR
VICTOR EHMIG
BY
ATTORNEYS May 26, 1931.    V. EHMIG    1,807,203
CONSTRUCTION OF AEROPLANES
Filed Sept. 17, 1930    7 Sheets-Sheet 3
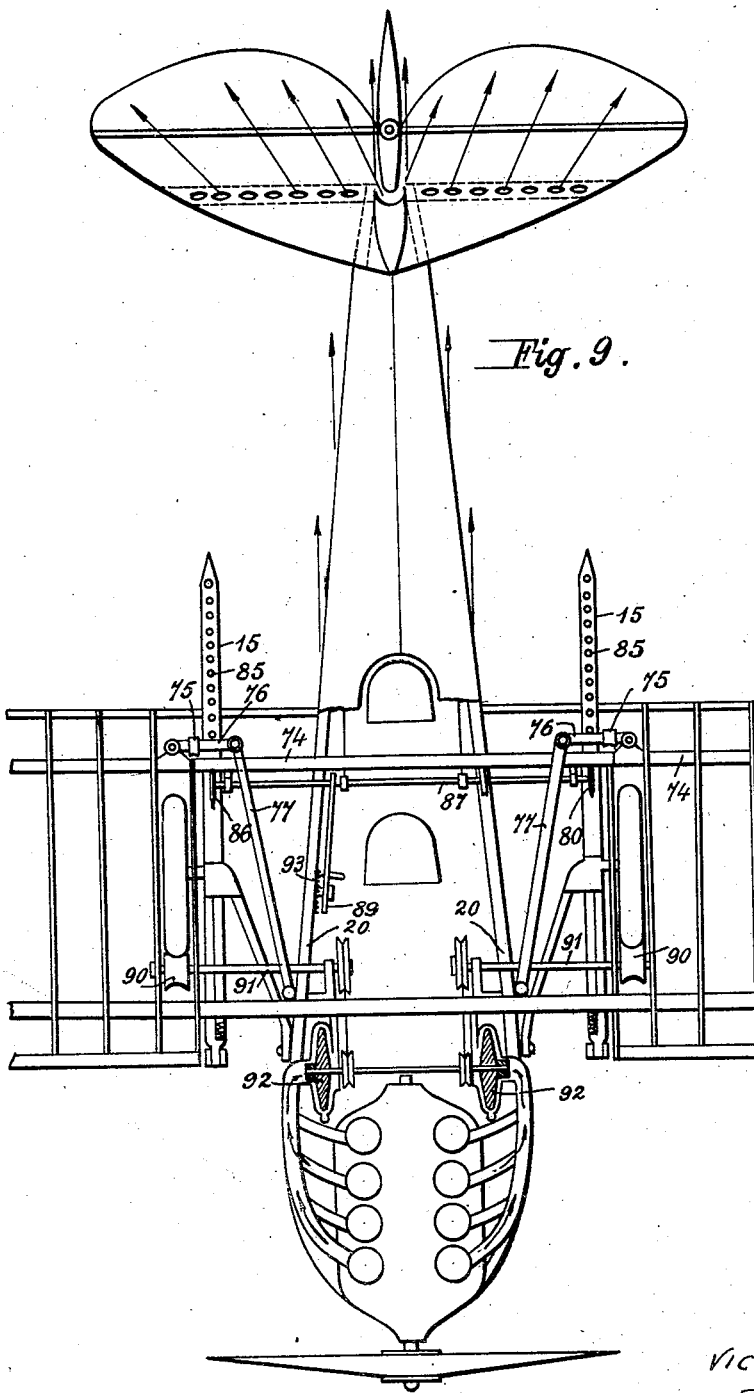
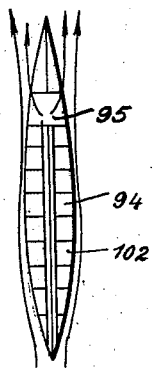
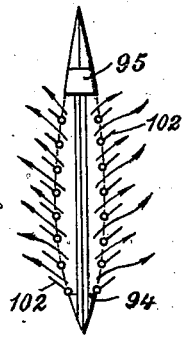
INVENTOR
VICTOR EHMIG
BY
ATTORNEYS May 26, 1931.  V. EHMIG  1,807,203
CONSTRUCTION OF AEROPLANES
Filed Sept. 17, 1930   7 Sheets-Sheet 4

INVENTOR
VICTOR EHMIG
BY
ATTORNEYS

INVENTOR
VICTOR EHMIG
BY
ATTORNEYS

INVENTOR
VICTOR EHMIG
BY
ATTORNEYS

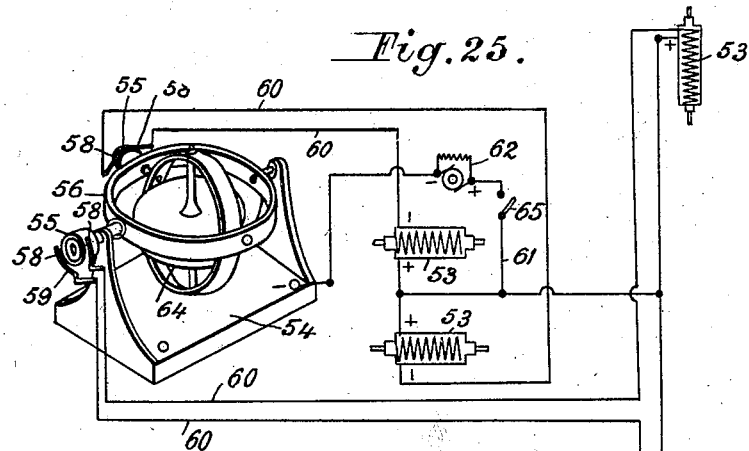
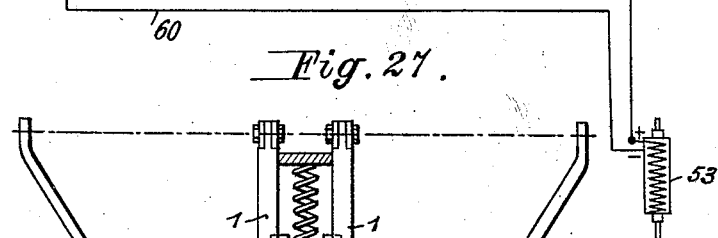
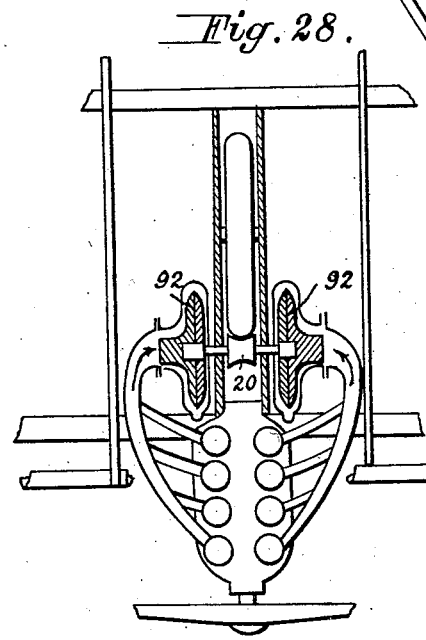

Patented May 26, 1931

1,807,203

UNITED STATES PATENT OFFICE

VICTOR EHMIG, OF LA GARENNE COLOMBES, FRANCE

CONSTRUCTION OF AEROPLANES

Application filed September 17, 1930, Serial No. 482,441, and in France September 19, 1929.

The present invention relates to improvements in the construction of aeroplanes in order to reduce the danger of overturning and of landing, as well as the inherent resistance to travel and the noise of the exhaust, and to provide for effective controls at all speeds and in all positions of the aeroplane.

For this purpose, the struts of each separate half of the landing gear, which are rigidly connected with the supports in which the movable wheel-carrying tubes are slidable will always maintain their vertical position and will provide for a long stroke of the shock-absorbers when landing, and without any inclination of the wheels or rebounding, due to the pressure of said wheel-carrying tubes upon suitable struts, caused by the gradual and progressive tension of elastic cords.

The horizontal force of friction upon the wheels, which is often considerable in the case of a bad landing, or when landing upon broken ground, or by a braking of the wheels by which the machine may be overturned, is imparted by the rear struts to the fuselage, thus compensating for the unequal value of the two forces resulting from the friction upon the wheels and from the force of inertia of the machine, whereby the danger of overturning will be diminished.

The said landing gear whose wheels always maintain the vertical position may be lifted into the wings in such manner that the upper halves of the wheels will be concealed in said wings, whilst the lower halves which extend from the bottom part of the wings are acted upon and rotated by reason of the relative speed of the aeroplane and offer only a small resistance of travel, the lateral stability of the aeroplane being much increased by the gyroscopic effect of the wheels of the landing gear.

In order to prevent the air from entering the recesses of the wings containing the wheels of the landing gear, suitable slots are provided at the rear parts of said recesses in such manner that the air compressed under the wings will flow upon the wheels and will proceed thence into the region of partial vacuum, thus rotating the wheels at a high speed whereby the lateral stability of the aeroplane will be much increased.

For the purpose of limiting the proper latral stability of high-speed aeroplanes, the tyres of the landing wheels may be placed in contact with pulleys mounted upon driving gear connected with air fans receiving the exhaust gas of the engines and withdrawing air from the top surface of the wings, which air is mingled by the said fans with the exhaust gas and is then discharged to the rear upon the rudders, thus increasing the vaccuum on the top of the wings while reducing the drift while assuring the effective operation of the rudders.

The curved constructions on the top parts of the wings covering the upper halves of the landing wheels which would extend out of the said wings, are provided with movable flaps which open at the same time as movable deflecting devices positioned in the rear of the wheels and upon the bottom of the wings when the pilot uses the lateral control and this sends an irregular stream of air upon the top of the wing on the side on which the wing flap is raised, thus eliminating the lifting power on this side while increasing the resistance and efficacy of the lateral rudders.

The partial vacuum produced by the air fans may be used in vacuum cylinders as a servo-motor device whereby the piloting will be facilitated.

The cocks or valves situated between the suction pipes and the said cylinders may be automatically controlled by electro-magnets under the control of a small gyroscope operating at high speed in a universal suspension device and whose axles serve to make contact for the electric circuit.

In the accompanying drawings which are given by way of example:

Fig. 6 is a plan view of the central part of the aeroplane, showing the rods connected with the supports of the movable stops making contact with the rear struts, and the means for displacing the stops.

Fig. 7 is a rear view of a spar in which the movable stop is displaced in order to raise the landing gear.

Fig. 8 shows the landing gear when partly raised.

Fig. 9 is a plan view of the central part of the aeroplane and the fuselage, the wheels being raised and brought into contact with the driving gear, actuating the fans which draw in air from the centre of the thrust on the wings and mingle it with the exhaust of the engine, then circulating it to the rear upon the rudders at a speed which is several times that of the relative speed of the aeroplane.

Figure 1:
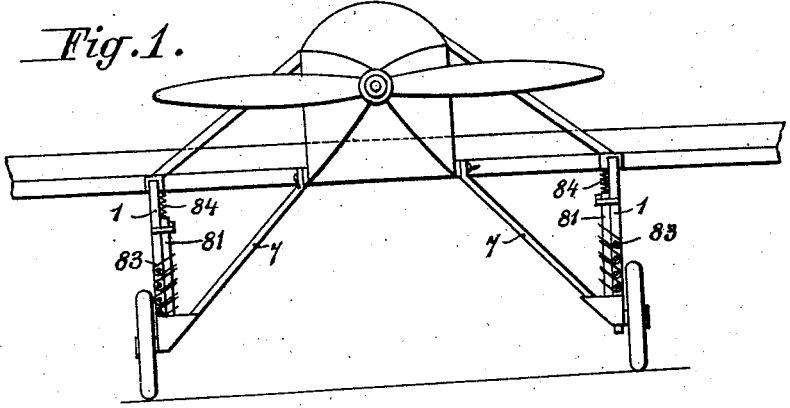
Fig. 1 is a front view of a monoplane with lowered wings, showing the landing gear consisting of two separate parts whose struts are rigidly assembled with stays, and the vertical position of the wheels which are mounted on internal tubes slidable in the stationary outer parts of the struts.
Figure 2:
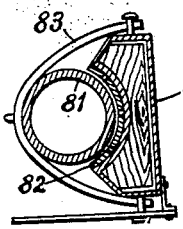
Fig. 2 is a section of a strut at a point adjacent the shock-absorbers, showing the suspension of the elastic cords, and the friction facing secured to the external part against which the movable tubes are pressed by elastic cords, thus braking the shocks and preventing all rebounding of the machine when landing.
Figure 3:
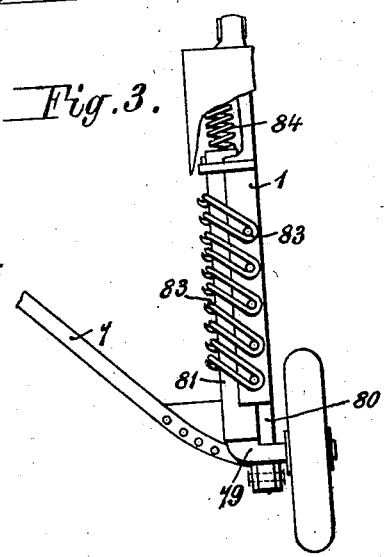
Fig. 3 shows the mounting of the right-angled axle upon the inner movable tube which is slidable in a slot in the lower part of the strut, and also the reaction spring at the upper end, which returns the movable tubes to the initial position.
Figure 5:
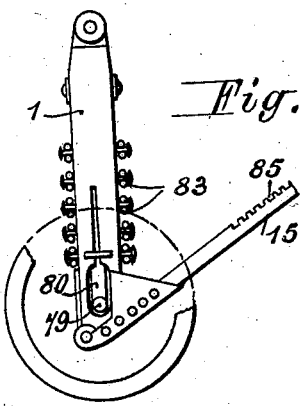
Fig. 5 is a side view of one-half of the landing gear, showing the slot in the lower end in which the wheel axle is slidable, and the pivoting of the rear strut which is provided with holes in which is engaged a small pinion serving to raise the landing gear into the wings.
Figure 4:
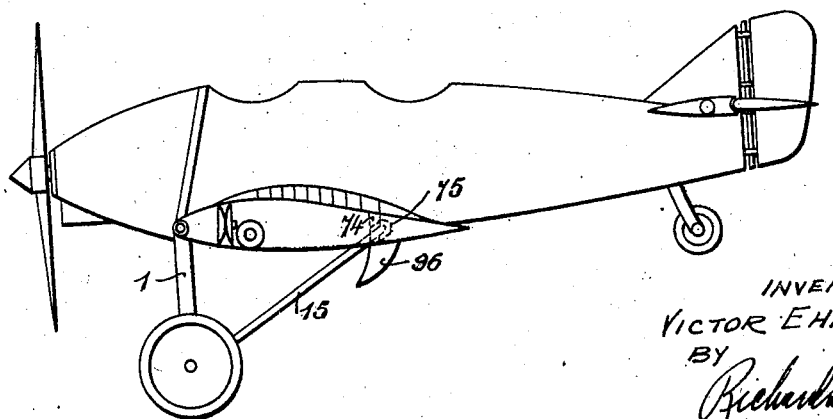
Fig. 4 is a side view of the aeroplane showing the pivot mounting of the strut upon the leading edge of the wing and also the rear strut which is slidable in the rear spar and makes contact with a stop.
Figure 10:
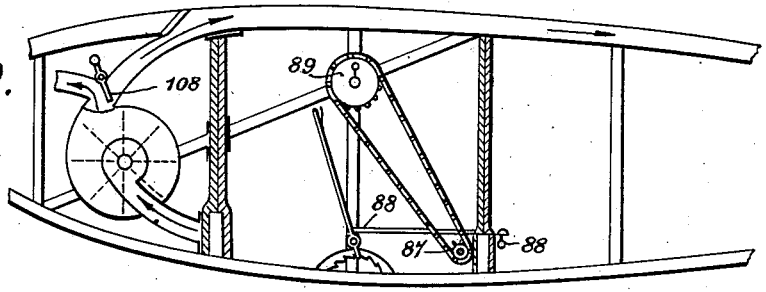

Fig. 10 shows the arrangement of the air fans and of the devices for raising and fastening the landing gear in the interior of the fuselage, as well as the valve adapted to send the compressed air to the admission end of the engine at high altitudes.

Fig. 11 is a section of a wing showing a wheel which is raised into contact with the driving pulley, and the slot in the rear end of the recess of the curved covering portion of the aeroplane top, through which is circulated the current of air which is compressed under the wing and which escapes into the partial vacuum, as well as the deflecting device mounted at the rear of the wheels.

Figs. 12 and 13 show the said curved portion and the deflecting device in the closed position, in normal flight.

Figs. 14 and 15 show the same when moved outwardly when the pilot acts upon the controls, so that the said curved portion and the deflecting device will open at the side on which the wing flap is lifted, thus reducing the lifting power and increasing the resistance on this side.

Figure 16:
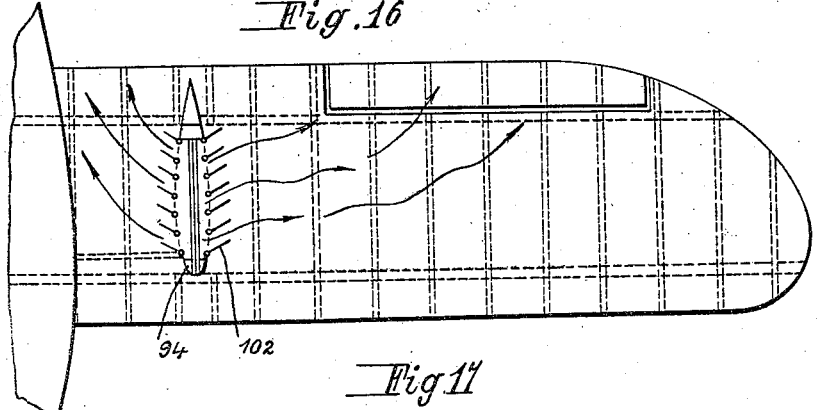

Fig. 16 is a plane view of a wing on the side on which the wing flap is raised and the flaps of the said curved covering portion are open, showing the whirls by which the vacuum is overcome.

Figure 17:
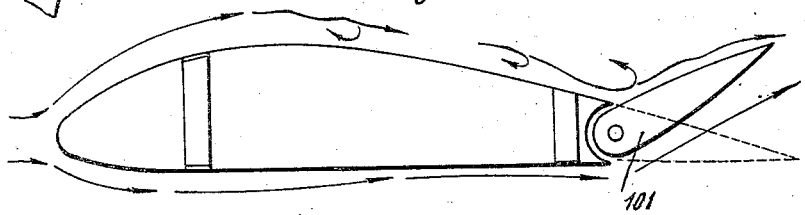
Figure 18:
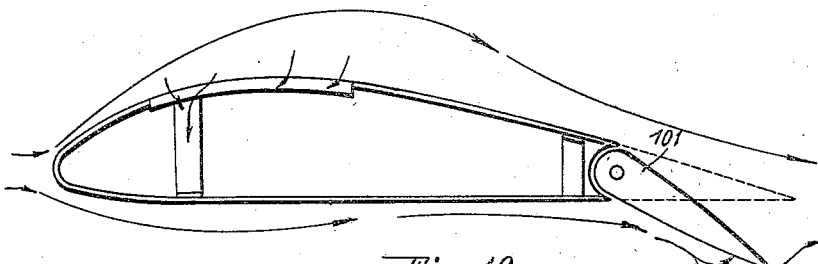

Fig. 17 is a section of the wing on the side on which the wing flap is raised, and Fig. 18 is a section of the wing on the other side on which the wing flap is lowered and on which the vacuum is increased by the suction of the two air fans.

Figure 19:
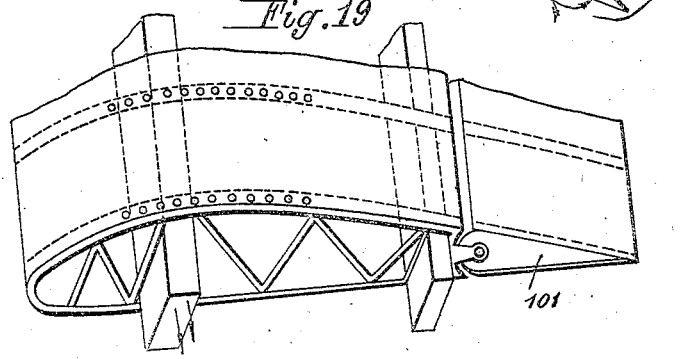

Fig. 19 is a partial perspective view on a larger scale of a part of the wing, showing the suction holes on the top of the aeroplane at the centre of thrust.

Figure 20:
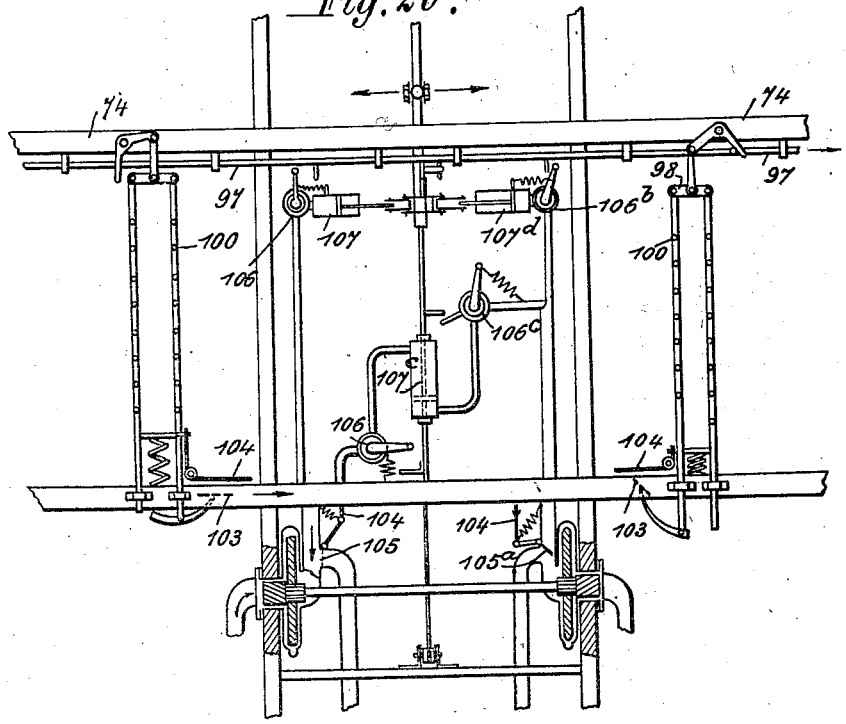

Fig. 20 shows the use of vacuum cylinders to facilitate the steering operations, and the mechanism for opening the flaps of the said curved portions and for changing the direction of the suction, which is operated at the same time as the controls.

Figure 21:
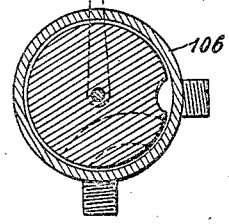
Figure 22:
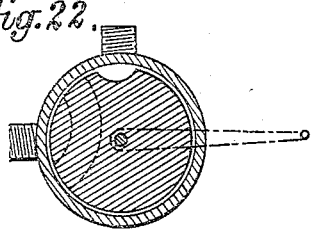

Figs. 21 and 22 show the cocks of the vacuum cylinders in the neutral position.

Figure 23:
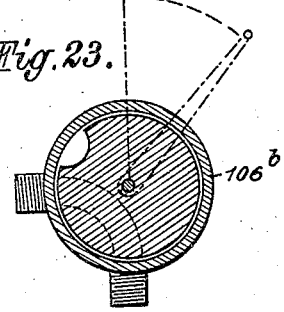
Figure 24:
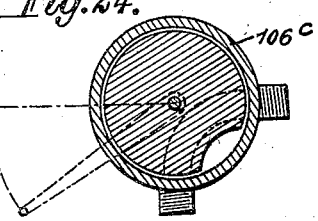

Fig. 23 shows the operative position of a cock adapted for lateral control, and Fig. 24 the like position of a cock for elevating control.

Fig. 25 is a diagrammatic view of the electric installation, showing a gyroscope with pivoted suspension frame, which controls the electro-magnets for automatic steering.

Figure 26:
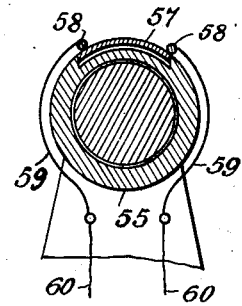

Fig. 26 shows an axle of the suspension frame serving as a contact-making device in the neutral position, with the circuit broken.

Fig. 27 shows one half of a landing apparatus for a large aeroplane, or an aeroplane having two lateral engines.

Fig. 28 shows this apparatus in the raised position and adapted to drive two air fans mounted in the said curved covering portion in the rear of the engines.

Figure 29:
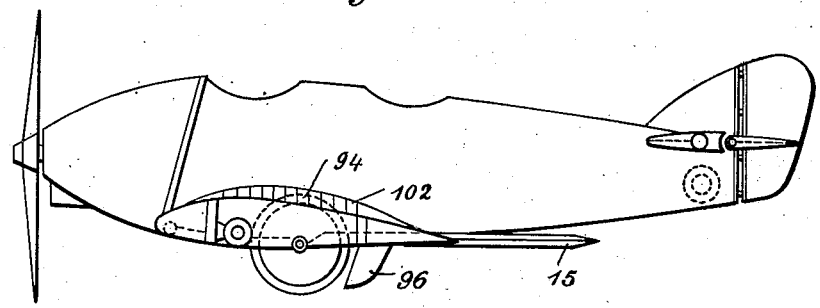

Fig. 29 is a side view of a monoplane in flight, the landing gear being raised into the wings and in contact with driving pulleys which actuate the air fan.

Figure 30:
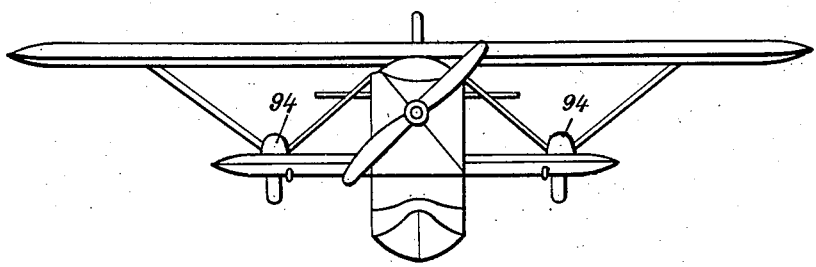

Fig. 30 is a front view of a land-and-water plane showing the landing gear raised into the small rear wings which serve at the same time as floats when landing on the water.

The landing gear of an aeroplane comprising two independent parts, and without axle (Figs. 1 to 5) consists of two vertical struts 1 which are rigidly assembled with stays 7, pivotally mounted on the leading edges of the wings or on the front beams, according to the construction and the depth of the wings, and with the rear struts 15 which are pivoted to the lower ends of said struts 1, and are slidable in the rear spars 74 and in apertures formed in the wings, in which they abut against movable stops 75 whose supports 76 are connected by rods 77 with the fuselage 20 which receives the friction forces and the front shocks brought upon the landing wheels, thus reducing the danger of overturning and of veering about on one wheel.

In order to obtain a long movement of the shock-absorbers without any inclination of the wheels, these latter are mounted upon two right-angled axles 79 slidable in slots 80 formed in the struts, said axles being mounted on movable tubes 81 which are pressed upon a friction facing 82 by elastic cords 83 which prevents all rebounding when landing; reaction springs 84 assure the return of the movable tubes to the initial position.

To diminish the internal resistance of the apparatus to the forward movement of the aeroplane when in flight, the landing gear whose wheels always maintain their vertical position may be lifted into the wings. For this purpose, the rear struts are provided with a row of holes 85 in which are engaged small pinions 86 mounted on a shaft 87 which is controlled by the pilot or by a suitable motor.

When the aeroplane has reached a certain altitude, the pilot releases the rear struts by displacing the stops 75 by means of the controlling gear 88 (Fig. 6) and he raises the landing gear by the use of a handle or a handwheel 89 until the wheels make contact with the pulleys 90 of the driving gear 91 cooperating with the air fans 92, and then holds it fast by a stop 93 (Figs. 7, 8, 9, 10 and 11).

In the raised position of the landing gear, the upper halves of the wheels are concealed in the wings and the covering portions below the top facing, whilst the lower halves which extend from the bottom facing of the wings are acted upon by the current of air which flows upon the wings, passing through an aperture 95 in the field of pressure under the wings, into the field of partial vacuum, whereby the said wheels are rotated at high speed. This diminishes the resistance to travel and increases the lateral stability of the aeroplane by the gyroscopic effect of the wheels.

In order to limit the inherent lateral stability of high-speed aeroplanes and to employ the centrifugal force of the wheels to advantage, said wheels drive the said fans 92 which draw in air from the top facing of the wings at the centre of thrust and mix it with the burnt gas from the engine, the whole being sent to the rear upon the rudders at a speed which is several times that of the relative speed of the aeroplane.

This reduces the noise of the exhaust without diminishing the power or the cooling of the engine, and it also increases the suction on the top of the wings whereby the centre of thrust is made more stable, and it further reduces the drift and assures the effective operation of the rudders at all speeds and in all positions of the aeroplane.

The consequences of a slow-up, which are often serious, are thus eliminated, for even should the engine suddenly stop, the rudders will maintain their efficacy for a considerable time on account of the centrifugal force stored up in the air fans and wheels.

To prevent all formation of whirls in the rear of he wheels upon the bottom face of the wings, deflecting devices 96 are provided in order to guide the streams of air, said devices consist of two movable parts which are urged into the closed up position by a spring, and when the aeroplane is inclined to one side by an angular displacement about its longitudinal axis and when the pilot takes measures to return his machine into the proper position by acting upon the wing flap controls 97, the deflecting device 96 will now open out by the action of a lever 98 (Fig. 13) upon the pivot 99, in automatic cooperation with the flaps of the said covering portion by the action of a control 100 (Fig. 20) which operates at the same time as the control of the raised wing flap 101 (Fig. 17) and thus the air supplied under the wing and upwardly deflected will proceed upon the top surface of the wing through the set of flaps 102 (Figs. 14–16) of the said covering part which are now open, thus producing an irregular current of air which overcomes the suction or vacuum while increasing the drift, thus equalizing the resistance of the two wings and facilitating the lateral straightening of the aeroplpane by reducing the flexions of said wings (Figs. 12–18).

The front spars of the wings serve as suction conduits, and when the wing flap rises, and the suction is cut off on this side by a valve 103 which is automatically controlled by the flaps of the said covering part, and at this time the suction is doubled upon the wing whose flap is lowered (Fig. 20).

In order to obtain the proper adhesion to the ground when landing, the controls 100 may be connected with the controls 104 of the wheel brakes and with the special valves 105 situated in the suction conduit in front of the air fans, and thus when the pilot throws the brakes upon the wheels, the said flaps and the deflecting devices will open and thus overcome the lifting power, and the valves 105 will afford a suction current upon the engine, which is a great advantage for engines whose cylinders are mounted in line and are air-cooled, and which would heat up too rapidly when on the ground the cooling fans being now affected by the exhaust current.

To further the handling of large-sized aeroplanes by using the suction of the air fans upon the vacuum cylinders, the side-steering controls and the elevators are provided with pins for operating the supply cocks or valves 106, in order that the pistons of the cylinders 107 may act upon the controls, as shown in Figures 20–24, the cocks 106ᵇ and 106ᶜ and the cylinders 107ᵈ and 107ᵉ being now operative. Said cocks, which act under a very small force, may be automatically controlled by small electro-magnets which are in turn controlled by a small gyroscope rotating at high speed in a universal suspension frame.

To relieve the pilot from constantly correcting the effects of rolling and of the reversing couple due to the propeller, as well as the effects of pitching, the supply cocks may be automatically controlled by electro-magnets 53 under the control of a gyroscope 54 driven by a small electric motor (Figs. 25 and 26).

For this purpose, the ends of the axles 55 of the said frame 56 are provided with insulating plates 57 in slight friction contact with small balls 58 mounted on the upper ends of brushes 59 (Fig. 25). The said brushes are connected by insulated wires 60 with the coils of the electro-magnets.

The metallic part of the axles 55 of said frame which serve as current contact members, is in permanent contact with the negative pole of the electric circuit which is connected with the metallic frame, the positive pole being connected by insulated wires 61 with the coils of the electro-magnets.

If the pilot wishes to travel in a straight lines, he closes the switch 65, thus supplying current to the electro-magnets 53.

For all inclinations or rotary movements of the aeroplane, the axes of the gyroscope frame will remain in the fixed position whilst the brushes move to the side towards which the aeroplane is inclined. The brush on that side will make contact with the metallic part connected with the negative pole, thus closing the circuit of the electro-magnet on the side on which the wing flap is to be raised. This electro-magnet acts upon a feeding cock for the supply of the piston of a vacuum cylinder; said piston actuates the controlling device in such manner that the position of the aeroplane will be corrected before it assumes a critical position whether lateral or longitudinal, which operation cannot always be performed by the pilot.

The danger of a slowing up when in flight or of an involuntary corkscrew turning now becomes impossible, and even should the pilot be forced in exceptional cases to make a very sharp turn, or to upturn his machine beyond the critical angle, or in cases in which a strong gust of wind, or a sudden stopping of the engine would slow up the machine and it would then turn in corkscrew fashion, he will always be enabled to straighten his machine, as the inertia of the wheels of the landing train causes the fans to operate at high speed, and thus the wing flaps and rudders act in an effective manner for a sufficient time to bring the machine into the line of travel and without a diving motion.

The ends 38 of the pivoting frame 39 (Figs. 25 and 26) provided with the insulating plates 40, serve as switching devices which make a light contact with small balls mounted on the upper ends of the brushes 42 which are connected by the insulated wires 43 with the coils of the electro-magnets 44.

The metallic part of the axles 38 of the said frame is in constant contact with the negative pole of the circuit, which is connected with the said frame whilst the positive pole is connected by the insulated wires 45 with the coils of the electro-magnets.

If the pilot wishes to travel in a straight line, he closes the switch 46 and thus sends current into said frame and hence into the coils of the electro-magnet.

For all inclined positions of the aeroplane, the axes of the gyroscope frame remain in the fixed position for a certain time, whilst the brushes move to the side towards which the aeroplane is inclined, and the brush on this side makes contact with the metallic part connected with the negative pole, thus closing the circuit of the electro-magnet which serves to open the feeding cock of the vacuum cylinder whose piston actuates the controlling device in such manner that the position of the aeroplane will be corrected before it has assumed a critical lateral or longitudinal position, which cannot always be performed by the pilot (Figs. 25 and 26).

If the pilot desires to handle his machine for getting off the ground or for landing, he breaks the electric circuit in order to prevent any automatic action.

The dynamo supplying the current can be driven by the common shaft of the air fans.

A valve for free exhaust may be mounted upon the exhaust pipes outside the fuselage, and thus in the case of a breakdown of the engine the pilot can open this valve in order to avoid braking the air fans; or in the case of a flight at high altitudes, the compressed air discharged from the fans, which may pass through a valve 108 (Fig. 10) to the gas intake of the engine in order to maintain its power, will not be mingled with the exhaust gas.

The advantage of the use of air fans for the additional feeding of the engine at high altitudes consists in the fact that the speed of the wheels of the landing gear increases as the square of the speed of the aeroplane which gradually increases with the altitude if the power of the engine remains constant by the use of a propeller in which the angle of the blades can be varied.

I claim:

1. In an aeroplane, landing gear comprising struts, stays which are rigidly secured to said struts and bear upon the fuselage between the wheels, rear struts pivoted to the front struts and bearing upon the fuselage in the rear of the centre of gravity, movable tubes carrying the wheels and slidable in said front stays, elastic cords attached to said tubes and also to the front struts, means for raising the landing gear in order to bring the wheels half-way into the wings, air fans whose suction end is connected with the atmosphere on the top face of the wings and also with the exhaust of the engine, means for the control of said fans by the rotation of the wheels due to the current of air, discharge conduits for said fans leading to the rudders, vacuum cylinders, conduits connecting the suction end of the air fans with said cylinders, pistons cooperating with said cylinders and connected with the aeroplane controls, and cocks controlling said conduits.

2. In an aeroplane, landing gear adapted to be raised, curved covering portions formed in the wings to receive the upper halves of the wheels, and flaps mounted on said curved portions and adapted to open upon the top of the wings.

3. In an aeroplane, landing gear adapted to be raised, curved covering portions formed in the wings to receive the upper halves of the wheels, flaps mounted on said curved portions and adapted to open upon the top of the wings, and deflecting devices mounted at the rear of the wheels and on the bottom of the wings.

4. In an aeroplane, landing gear adapted to be raised, curved covering portions formed in the wings to receive the upper halves of the wheels, flaps mounted on said curved portions and adapted to open upon the top of the wings, deflecting devices mounted at the rear of the wheels and on the bottom of the wings and consisting of two pivoted parts which are closed together by a spring, wing flap controls which are also adapted to open out these two pivoted parts, and controls for the flaps of the said curved covering portion which are connected with the wing flap controls.

5. In an aeroplane, means for raising the landing gear in order to bring the wheels half-way into the wings, air fans whose suction conduits are connected with the atmosphere on the top face of the wings and also with the exhaust of the engine, means for actuating the air fans by the rotation of said wheels when these latter are in the raised position, discharge conduits for the air fans leading to the rudders, vacuum cylinders, conduits connecting the suction ends of the fans with said cylinders, pistons cooperating with said cylinders and connected with the aeroplane controls, cocks controlling said conduits, and wing flap controls connected to said cocks.

6. In an aeroplane, means for raising the landing gear in order to bring the wheels half-way into the wings, air fans whose suction conduits are connected with the atmosphere on the top face of the wings and also with the exhaust of the engine, means for actuating the air fans by the rotation of said wheels when these latter are in the raised position, discharge conduits for the air fans leading to the rudders, vacuum cylinders, conduits connecting the suction ends of the fans with said cylinders, pistons cooperating with said cylinders and connected with the aeroplane controls, cocks controlling said conduits, and electromagnets under gyroscope control adapted to control the said cocks.

In testimony whereof I affix my signature.

VICTOR EHMIG.